Sept. 14, 1965 L. F. BEDAN ETAL 3,206,253
AUXILIARY TRACTION DEVICE
Filed Jan. 14, 1963 3 Sheets-Sheet 1
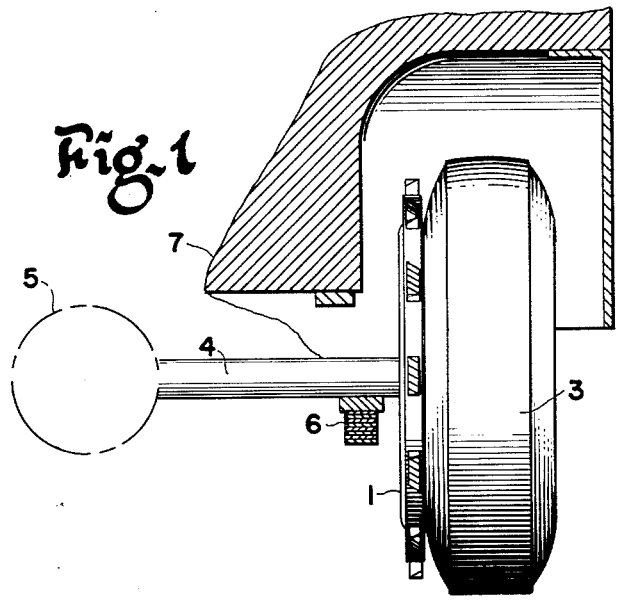
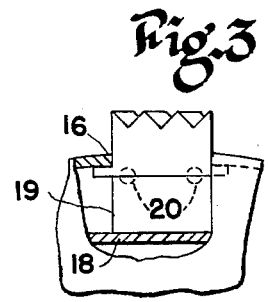
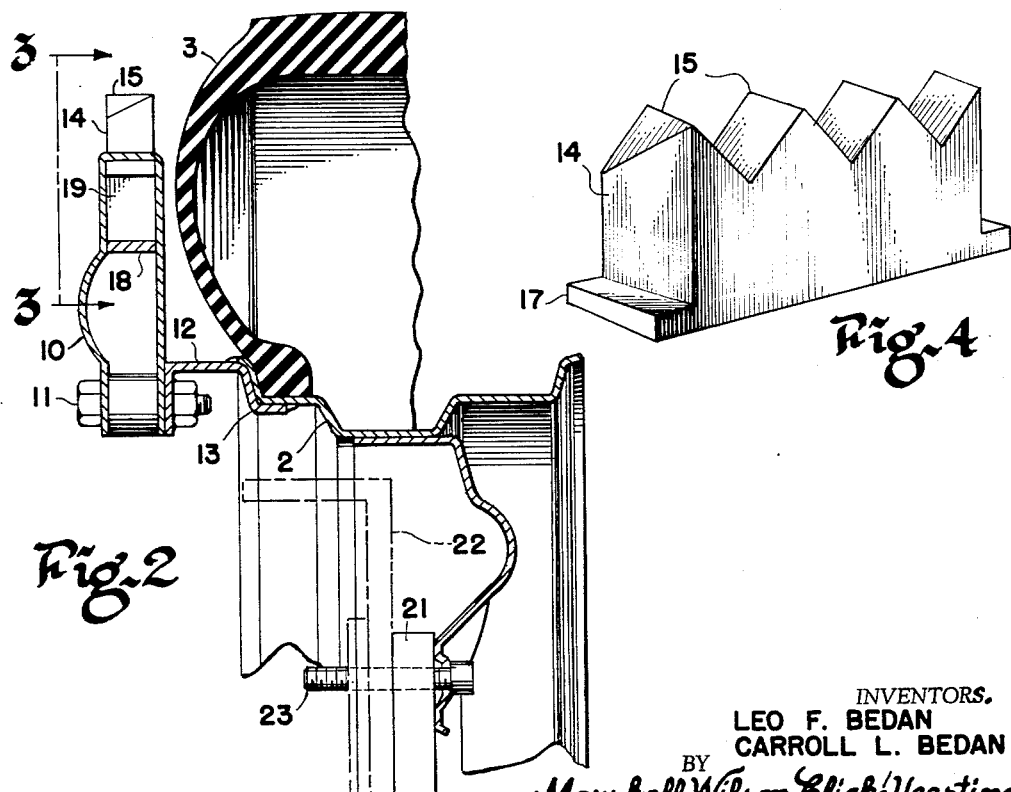
INVENTORS.
LEO F. BEDAN
CARROLL L. BEDAN
BY Marshall, Wilson, Blick & Yeasting
-attorneys- Sept. 14, 1965  L. F. BEDAN ETAL  3,206,253
AUXILIARY TRACTION DEVICE
Filed Jan. 14, 1963  3 Sheets-Sheet 2
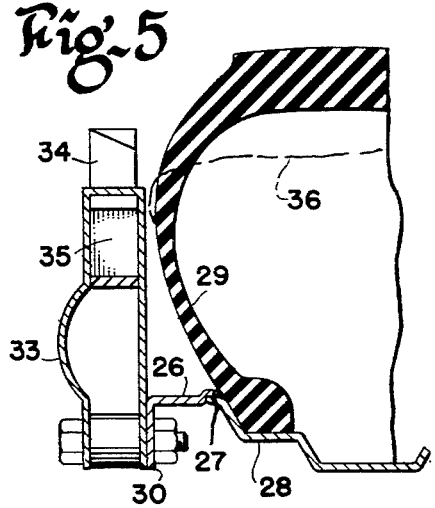
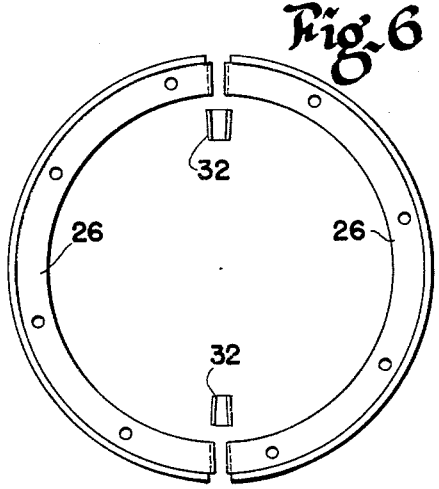
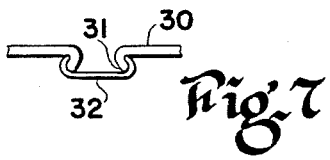
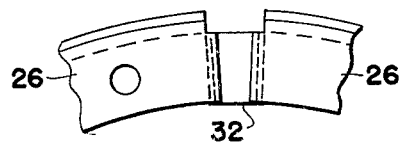
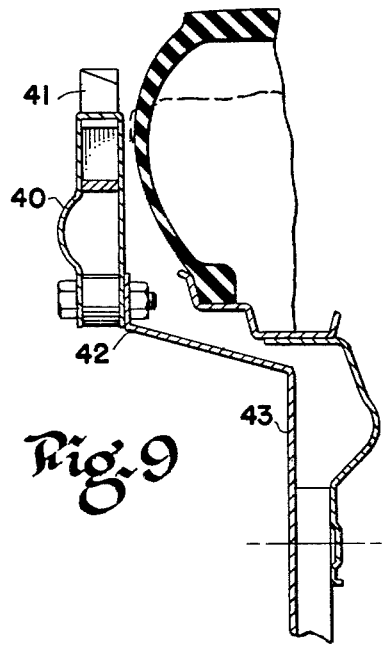
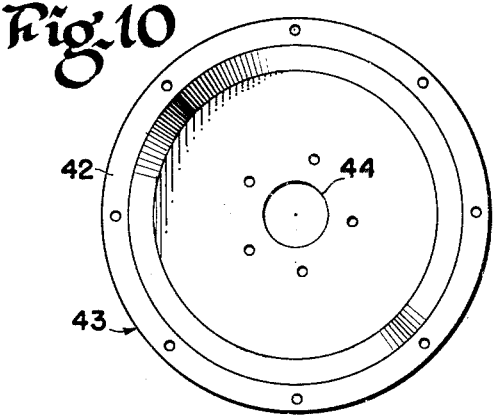
INVENTORS.
LEO F. BEDAN
CARROLL L. BEDAN
BY Marshall, Wilson, Blické Yeasting
-attorneys- Sept. 14, 1965   L. F. BEDAN ETAL   3,206,253
AUXILIARY TRACTION DEVICE
Filed Jan. 14, 1963   3 Sheets-Sheet 3
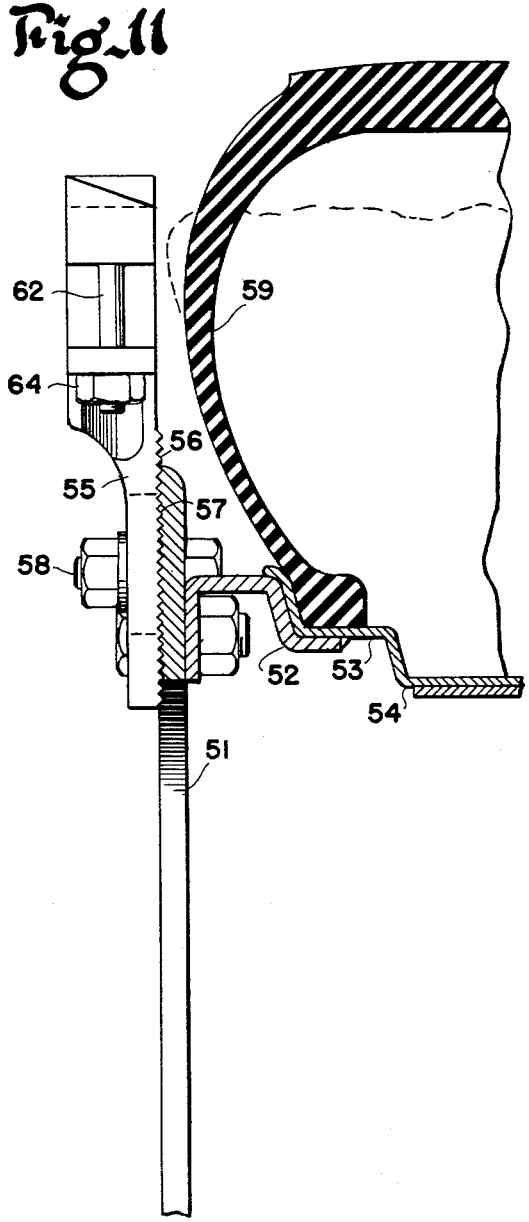
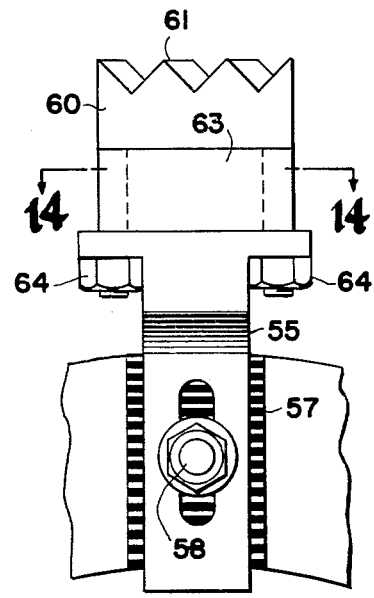
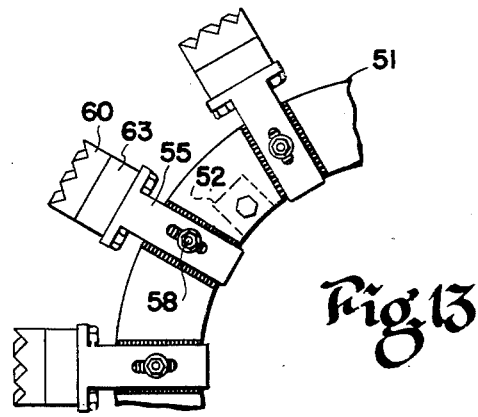
INVENTORS.
LEO F. BEDAN
CARROLL L. BEDAN
BY Marshall, Wilson, Click & Yeasting
— attorneys —

3,206,253
AUXILIARY TRACTION DEVICE
Leo F. Bedan and Carroll L. Bedan, Floyds Knobs, Ind.
Filed Jan. 14, 1963, Ser. No. 251,212
1 Claim. (Cl. 301—37)

This invention relates to automotive vehicle drive wheels and in particular to auxiliary means for providing positive traction on ice-covered highways.

One of the hazards often encountered in driving automobiles in the winter season in the northern climates is the loss of traction when the roadway is covered with ice or densely packed snow. Tire chains are often used to increase the traction on ice or packed snow but chains are difficult to put on and are objectionable when driving on dry pavement. Snow tires, tires with a special tread, are quite effective on fresh snow but do not afford good traction on ice or densely packed snow when the tread does not break through the surface of the ice or packed snow.

The principal object of this invention is to provide auxiliary traction equipment for the drive wheels of an automotive vehicle suitable for use on ice and densely packed snow.

Another object of the invention is to provide auxiliary traction equipment that is normally inactive but which may be brought into engagement with an icy road surface by partial deflation of the tire on the wheel with which the auxiliary traction means is associated.

A still further object of the invention is to provide an auxiliary wheel or frame that is mounted on a drive wheel of an automotive vehicle, the auxiliary traction means being provided with resiliently mounted lugs having sharpened teeth capable of fracturing an icy surface or glaze on packed snow when brought into engagement therewith.

A still further object of the invention is to provide an auxiliary traction device for an automotive vehicle in which the periphery of the auxiliary traction device is provided with radially extending lugs that are resiliently urged radially outwardly with a force sufficient to break an ice surface or glaze on packed snow but insufficient to support the weight of the vehicle.

A still further object of the invention is to provide an auxiliary traction device for use on ice and densely packed snow in which the traction device is permanently mounted as a portion of a drive wheel of the vehicle.

More specific objects and advantages are apparent from the following description of an auxiliary traction device constructed according to the invention.

According to the invention a disk or annular frame forming an auxiliary wheel is temporarily or permanently attached to the axle hub or rim of a drive wheel of an automotive vehicle preferably on the side of the rim toward the body of the vehicle, the auxiliary wheel or frame being provided with a plurality of resiliently-supported radially-outwardly directed lugs the outer ends of which, when the associated tire is partially deflated, are adapted to engage the ice or packed snow on a road surface with sufficient force that the teeth of the lugs crush the surface of the ice or packed snow on the roadway. The resilient mounting for each of the lugs is soft enough so that the lug may yield to cushion the impact and prevent the bumping that occurs if the lugs are solidly mounted.

Preferred forms of the invention are illustrated in the accompanying drawings.

In the drawings:

FIGURE 1 is a fragmentary section of a portion of a motor vehicle showing a drive axle, a drive wheel and an auxiliary traction device according to the invention installed on the drive wheel.

FIGURE 2 is an enlarged section of a portion of a tire of a drive wheel, the rim for the tire, and a portion of the auxiliary frame and lugs providing the auxiliary traction device.

FIGURE 3 is a fragmentary side elevation, with parts broken away and parts shown in section, of one of the lugs of the improved traction device.

FIGURE 4 is a greatly enlarged isometric view of one of the lugs.

FIGURE 5 is a section through a modified form of auxiliary traction device showing a different method of mounting the auxiliary frame or wheel.

FIGURE 6 is a front view of one form of rim of the improved traction device.

FIGURE 7 is a fragmentary detail of the locking means for the improved rim shown in FIGURE 6.

FIGURE 8 is an enlarged fragmentary front elevation of the joint in the annular rim of the structure shown in FIGURE 6.

FIGURE 9 is a fragmentary sectional view of another embodiment of the invention in which the auxiliary wheel is in the form of a disk mounted directly on the hub carrying the drive wheel of the vehicle.

FIGURE 10 is a front elevation of the disk shown in FIGURE 9.

FIGURE 11 is a sectional view showing still another form of auxiliary drive wheel and its method of attachment to the rim of a drive wheel of a vehicle.

FIGURE 12 is a front elevation of one of the lugs of the drive wheel shown in FIGURE 11 showing its method of mounting.

FIGURE 13 is a front elevation of a section of the improved drive wheel showing the circumferential spacing of the lugs.

FIGURE 14 is a transverse section taken substantially along the line 14—14 of FIGURE 12.

These specific figures and the accompanying description are intended merely to illustrate the invention and not to impose limitations on its scope.

Referring to FIGURE 1, an auxiliary drive wheel 1 constructed according to the invention is preferably mounted on a wheel rim 2 (FIGURE 2) supporting a tire 3. The wheel is mounted, by conventional means, on an axle shaft journaled in an axle 4 extending laterally from a differential housing 5. As is common practice the axle 4 is connected through a leaf spring 6 to the body 7 of a vehicle. The auxiliary drive wheel 1 is thus positioned directly adjacent the tire of the drive wheel and between the tire and the body of the vehicle where it is ready for use and concealed from view.

The auxiliary drive wheel preferably is constructed in the form of a hollow annulus 10 (FIGURE 2) that is connected by bolts 11 to clips 12 welded to a flange 13 of the rim 2 of the drive wheel. A plurality of lugs 14 (see also FIGURE 4) are each provided with teeth 15 on one face and longitudinally directed extensions 17 on each end. The lugs 14 are arranged to extend radially outwardly through the periphery of the annular frame 10 through rectangular apertures 16 in the outermost periphery of the annular member 10 with the extensions 17 limiting the outward travel. Preferably, so that the lugs may be assembled in the member 10, the apertures 16 are of a circumferential length slightly greater than the length of the body portion of the lug 14 and the aperture, as indicated in the right-hand portion of FIGURE 3, is extended downwardly in the front face of the auxiliary wheel or annular member 10 almost to a shelf 18 welded between the sides of the annular member 10 in position to support a block of rubber or neoprene 19 held compressed between the shelf 18 and the bottom of the lug 14. One or more steel balls 20 partially recessed into the bottom of the lug 14 and embedded in the top of the neoprene block 19 prevent any creeping of the resilient block 19 out of position.

This structure is applied to the vehicle wheel including the rim 2 by welding the clips 12 to the rim in position to bolt the annular member 10 in place. The lugs 14 are then slipped into position with the extension 17 engaging the inner surface of the annular member 10 adjacent the edges of the apertures 16. The neoprene blocks 19 are then forced into place.

It may happen that the clearances between the tire 3 and the adjacent portions of the vehicle are to close to admit the auxiliary traction wheel 1. If this occurs a spacer 21 may be inserted between a brakedrum 22 mounted on a hub 23 of the axle 4 to space the wheels including the rim 2 and tire 3 outwardly with respect to the body of the vehicle to gain sufficient space for the auxiliary traction wheel.

Normally, with the tire 3 properly inflated for normal road use, the teeth 15 of the lugs 14 clear the pavement by an inch to an inch and a quarter so that there is no wear of the lugs. When icy conditions necessitating the use of the lugs occurs the tire 3 is deflated sufficiently to allow the wheel to settle until the lugs are in firm engagement with the roadway surface, the engagement being with sufficient pressure so that the teeth 15 bear on the icy surface with sufficient pressure to fracture the surface of the ice or the glaze on packed snow and thus afford firm traction between the auxiliary wheel and the road surface.

FIGURES 5 to 8 inclusive show another means of mounting the auxiliary wheel. In this modification the mounting means comprises a pair of semi-circular formed members 26 (FIGURE 6) which, as may be seen in FIGURE 5, have inwardly turned lips 27 adapted to overly the edge of a rim 28 of the vehicle wheel in the space between the rim and a tire 29 mounted on the rim. Each end of a face portion 30 of each semi-circular member 26, as may be seen in FIGURE 7, has a hooked portion 31 adapted to be engaged by a retainer clip 32 arranged to be driven into locking engagement when the semi-circular pieces are fitted over the edge of the rim 28 of the wheel. To make a tight fit it is preferable to use a retaining clip 22 having converging side portions adapted to draw the ends of the seim-circular members 26 together as the clip is driven into place.

An auxiliary wheel 33 fitted with lugs 34, similar to the wheel 1 and lugs 14 is mounted on the semi-circular members 26. As in the first embodiment the lugs 34 are arranged to be resiliently supported on neoprene blocks 35 in position such that when the tire 29 is inflated the lugs 34 are free of the roadway surface but when the tire is partially deflated, so that the tire yields to load as indicated by a dotted line 36, the lugs 34 engage the road surface.

A third method of mounting the auxiliary traction wheel is illustrated in FIGURES 9 and 10. As shown in these figures an auxiliary traction wheel 40 fitted with lugs 41 is arranged to be bolted to the marginal portion 42 of a dish-shaped spider or auxiliary member 43. The central portion of the member 43 has holes that fit the regular wheel bolts so that the member 43 may be inserted between the brakedrum and the wheel and mounted by the usual wheel bolts. When this type of mounting is used it is preferable that the dish-shaped member 43 be provided with a central hole 44 similar to the large hole in the center of the wheel so that it may pilot on the corresponding hub of the axle and also guide the wheel to its proper position.

Still another embodiment of the invention is illustrated in FIGURES 11 through 14. As shown in these figures a solid annular member 51 is supported on a plurality of clips 52 that are welded to a rim 53 of an automobile wheel 54. A plurality of brackets 55 each of which is T-shaped in form are provided with grooved surfaces 56 to engage corresponding grooved surfaces 57 on the face of the annular member 51. The brackets 55 are held in place by bolts 58 and the interlocking of the grooves 56, 57 so that the flat portion of the T-shaped bracket 55 is directed radially outwardly and is located alongside a tire 59 mounted on the rim 53. Lugs 60 provided with teeth 61 are fitted with side bolts 62 that extend downwardly through holes in the bars of the T-shaped brackets 55. Neoprene blocks 63 are compressed between the lower surfaces of the lugs 60 and the upper surfaces of the T-shaped brackets 55, as seen in FIGURES 11 and 12, and are held compressed by tightening nuts 64 on the threaded lower ends of the bolts 62. Preferably the holes in the T-shaped portion of the brackets 55 are bell-mouthed each way so that the lugs may rock slightly without cramping the bolts 62 in the holes.

This arrangement offers the advantage that the height of the lugs relative to the tire 59 may be adjusted to meet whatever conditions are required. As in the preceding examples the height of the lugs relative to the tires is adjusted so that with the tire normally inflated the lugs are free of the road surface but when the tire is partially deflated the lugs engage the road surface to provide additional traction particularly on icy or glazed snow covered surfaces.

Various modifications of the structure may be made without departing from the spirit and scope of the invention.

Having described the invention, I claim:

An auxiliary traction wheel for a pneumatic tired drive wheel comprising, an annular member attachable to the rim of said drive wheel, a plurality of brackets individually attached to said annular member said brackets being adjustable radially, a lug for each bracket, a bolt-like member linking each lug to its bracket for limited rocking movement, said lugs being movable radially with respect to the annular member and to the respective brackets, and resilient means urging the lugs radially outward into position to engage a roadway when the tire on the drive wheel is partially deflated.

References Cited by the Examiner

UNITED STATES PATENTS

| | | | |
|---|---|---|---|
| 2,008,954 | 7/35 | Griebat | 301—44 |
| 2,108,346 | 2/38 | Paul | 301—50 X |
| 2,177,042 | 10/39 | Michael | 301—41 X |
| 2,714,042 | 7/55 | Kelly | 301—47 |
| 2,805,101 | 9/57 | Bruce | 301—47 |
| 3,112,138 | 11/63 | Kauer | 301—47 |

FOREIGN PATENTS

| | | |
|---|---|---|
| 276,316 | 10/51 | Switzerland. |
| 584,886 | 1/47 | Great Britain. |
| 961,397 | 11/49 | France. |
| 1,100,048 | 3/55 | France. |

ARTHUR L. LA POINT, *Primary Examiner.*

MILTON KAUFMAN, *Examiner.*